J. Robb.
Card Grinder.
Nº 86,452.　　　　　　　　　　Patented Feb. 2, 1869.
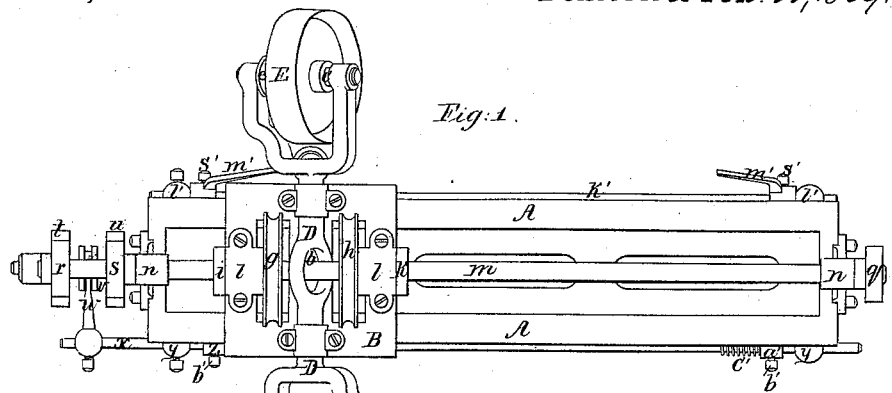
Fig. 1.
Fig. 5.
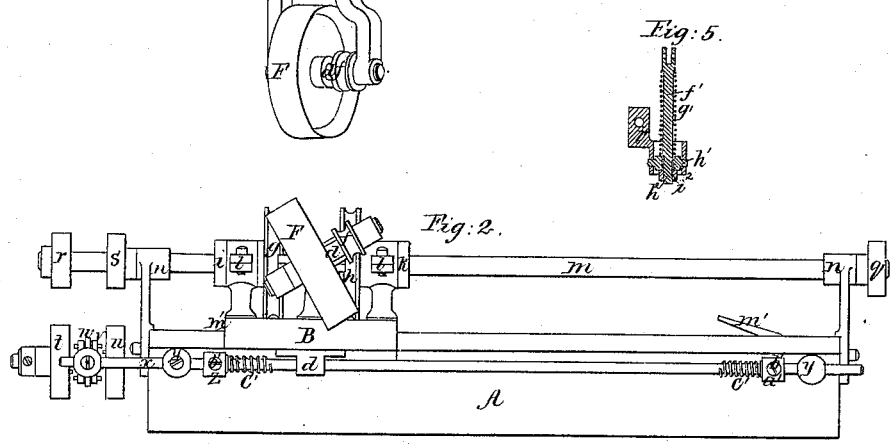
Fig. 2.
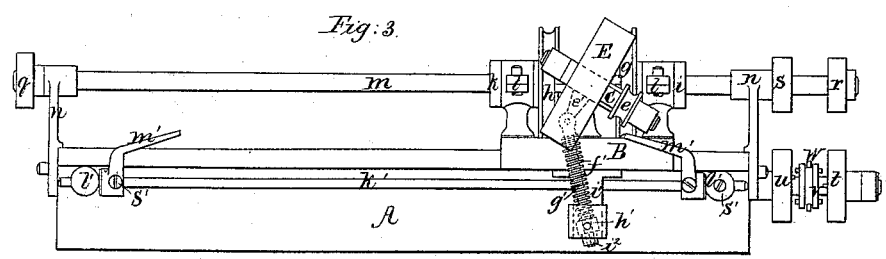
Fig. 3.
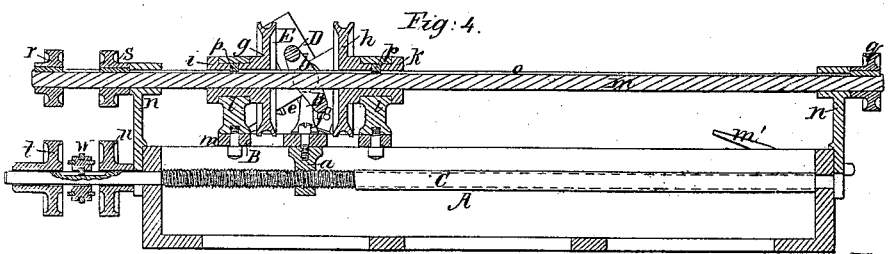
Fig. 4.
Witnesses;
Geo. H. Andrews
D. F. Hale Jr.
Inventor;
John Robb
by his attorney
R. H. Eddy
N. Peters, Photo-Lithographer, Washington, D.C.

JOHN ROBB, OF LAWRENCE, MASSACHUSETTS.

Letters Patent No. 86,452, dated February 2, 1869; antedated January 20, 1869.

IMPROVEMENT IN MACHINE FOR GRINDING CARDS.

The Schedule referred to in these Letters Patent and making part of the same.

*To all persons to whom these presents shall come:*

Be it known that I, JOHN ROBB, of Lawrence, in the county of Essex, and State of Massachusetts, have invented a new and useful Machine for Grinding the Cards of a Carding-Engine; and I do hereby declare the same to be fully described in the following specification, and represented in the accompanying drawings, of which—

Figure 1 is a top view,

Figures 2 and 3, side elevations, and

Figure 4 is a longitudinal section of it.

By means of this machine, either one or two top cards or one or two card-cylinders may be ground at once.

In the drawings—

A denotes the frame of the machine, such frame being like that of a common turning-lathe.

The carriage B is supported on the frame, so as to be capable of sliding rectilinearly thereon, its movements, in either direction, being effected by a long screw, C, which has its bearings in the ends of the frame, and screws into and through an arm, $a$, extended downward from the carriage.

The carriage B supports the rocker-shaft D, which extends across the carriage in manner as represented in the drawings, and is applied thereto so as to be capable of being turned axially as occasion may require.

This shaft has an eye, $b$, at its middle, and is forked at its opposite ends to receive and support the shafts, $c\ d$, of two rotary grinding-wheels, E F, and allow such wheels to be revolved with and by their shafts.

On each of the said wheel-shafts, a pulley or grooved wheel, $e$ or $f$, is fixed.

When the machine is in operation, the endless bands are applied to the wheels $e\ f$ and two wheels or pulleys $g\ h$, whose shafts, $i\ k$, are tubular, and sustained in boxes $l\ l$, upheld by the carriage B.

A driving-shaft, $m$, supported in standards $n\ n$, erected on the frame A, extends through the two shafts, $i\ k$, and is grooved lengthwise, as shown at $o$, to receive studs $p\ p$, projecting from the said two shafts. In other words, the three shafts have what is termed a "feather-connection," both shafts, $i\ k$, being free to slide on the shaft $m$, lengthwise of it.

There is a driving-pulley, $q$, on one end of the shaft $m$, and there are also two other pulleys, $r\ s$, fixed on the said shaft, near its opposite end.

The two pulleys, $r\ s$, are arranged directly over two other pulleys, $t\ u$, which run loosely on the shaft of the screw C, there being on such shaft, and between the two pulleys $t\ u$, a clutch, $v$, which is to be applied to the shaft, so as, when such clutch is revolved, it shall cause the shaft to revolve, the clutch being also capable of being slid endwise on the shaft, toward either pulley $t\ u$, in order to engage with it and clutch it to the shaft.

When the machine is in use, an endless belt should go around the pulleys $r$ and $t$, and there should be another endless belt, to go around the pulleys $s$ and $u$, this latter belt being crossed.

The clutch $v$ is provided with a shifting-fork, $w$, which extends into a groove made in the clutch, and about its circumference, such shifting-fork being fastened to a slide-rod, $x$, supported in bearings, $y\ y$, projecting from the side of the frame A, and going through a stud, $d'$, projecting from the carriage B.

On the said slide-rod two adjustable collars, or stops, $z\ a'$, are fixed by clamp-screws $b'\ b'$.

These collars are arranged between two bearings $y\ y$, and next to each collar, extending around the slide-rod, is one of two helical springs, $c'\ c'$.

When the driving-shaft $m$ is in revolution, the screw C will be set in rotation, and will cause the carriage B to traverse in one direction on the frame A. Just before the carriage may reach either terminus of its motion, the stud $d'$, by its pressure against one of the springs $c'\ c'$, will move the slide-rod so as to move the clutch in a manner to disengage it from one of the pulleys $t\ u$, and engage it with the other. In this way the rotary motion of the screw will be reversed, and the carriage will be caused to be moved in an opposite direction.

The shaft D, carrying the grinding-wheels, will also be turned, so as to inverse their inclined positions.

An arm, $e'$, extending from the rocker-shaft D, is jointed to a rod, $f'$, which goes through a spring, $g'$, and a short rocker-shaft, $h^1$, arranged within a bracket, $i^1$, which projects from the carriage B.

Figure 5 is a section of the bracket, the shaft $h^1$, the rod $f'$, and spring $g'$.

A screw, $h^2$, is formed on the lower part of the rod, and has a nut, $i^2$, screwed upon it and against the rocker-shaft $h^1$.

Furthermore, there extends horizontally through the bracket, a rod, $k'$, supported on studs $l'\ l'$, projecting from the frame A.

Two arms or trippers, $m'\ m'$, are fastened on and project from the rod $k'$, in manner as represented.

During each movement of the carriage, the rod $f''$ will be carried against one of the trippers, and will be moved so as to turn the rocker-shaft D, in a manner to reverse the inclination of its grinding-wheels.

From the above, it will be seen that each grinding-wheel, while in operation against a card, whether such be a "top card" or "card-cylinder," has the plane of its rotation inclined to the top card, or to the axis of the card-cylinder, and that such inclination is reversed preparatory to each passage of the grinder along such top card or card-cylinder.

It is found that this arrangement or mode of operation of the grinder, causes the teeth of the card to be ground with sharp and tiny points, highly advantageous for their working, and very much better than when the plane of rotation of the grinder is at right angles with the course of its movement lengthwise of the card.

I would remark that each, or one, of the trippers is to be applied to its carrier-rod, so as to be capable of being moved lengthwise thereon, and fixed thereto by a set-screw, $s'$. So each, or one, of the collars $z\ a'$ may be so fixed to its carrier-rod, the whole being to enable the length of traverse of the grinder to be determined according to the length of the card to be ground.

The purpose of the screw $h^2$ and the nut $i^2$ is to enable the inclination of the grinder or grinders to be varied as circumstances may require.

I have not exhibited in the drawings any top cards or card-cylinders, or mechanism for supporting such with reference to the grinders, as such will be well understood by persons skilled in the art to which my invention appertains.

What I claim as my invention or improvement in the above-described machine, is as follows:

1. I claim the arrangement of either or both of the grinders, so that its or their plane of rotation shall be at acute angles with its traverse or straight movement while grinding a card, when operated as set forth.

2. I also claim the combination for reversing the grinder or grinders, the same consisting not merely of the arm $e'$, the rod $f'$, and the spring $g'$, applied to the bracket $i^1$ and the shaft D, but also of the trippers $m'\ m'$, arranged, with respect to the rod $f'$, as specified.

3. I also claim the combination of the screw $h^2$ and nut $i^2$, on the rod $f'$, and the said mechanism for regulating the inclination of the grinder or grinders, as set forth.

4. I also claim the combination for effecting the traverse motion of the grinder or grinders, the same consisting of the driving-shaft $m$, the pulleys $r\ s\ t\ u$, having belts, as described, the clutch $v$, the fork $w$, the slide-rod $x$, the bearings $y\ y$, the collars $z\ a'$, on the same, and the springs $c'\ c'$; and in combination therewith, I claim the separate shafts $i\ k$, their feather-connection, one or both the pulleys $g\ h$, and one or both the pulleys $e\ f$, for effecting the revolution of the shaft or shafts of the grinding-wheel or wheels, as specified.

JOHN ROBB.

Witnesses:
R. H. EDDY,
F. P. HALE, Jr.